United States Patent

[11] 3,607,709

| [72] | Inventor | William H. Rice |
| | | Akron, Ohio |
| [21] | Appl. No. | 806,796 |
| [22] | Filed | Mar. 13, 1969 |
| [45] | Patented | Sept. 21, 1971 |
| [73] | Assignee | Air and Water Purification, Inc. |
| | | Akron, Ohio |

[54] OZONE GENERATOR
9 Claims, 3 Drawing Figs.

[52] U.S. Cl. ............................................. 204/317, 204/313
[51] Int. Cl. ............................................. C01b 13/12
[50] Field of Search ............................. 204/313, 322

[56] References Cited
UNITED STATES PATENTS
1,396,222  11/1921  Lindemann .................. 204/313
3,198,726  8/1965  Trikilis .......................... 204/320
3,309,304  3/1967  Caplan .......................... 204/313
3,457,159  7/1969  Fortier .......................... 204/313

*Primary Examiner*—Howard S. Williams
*Assistant Examiner*—Neil A. Kaplan
*Attorney*—Oldham & Oldham

ABSTRACT: This invention relates to an ozone generator basically comprised of at least two electrodes having a dielectric therebetween. The electrodes are made from stainless steel wire mesh and the dielectric is a sheet of high quality material such as mica. The ozone generator utilizes a relatively low amperage current in conjunction with a compact and simplified mounting and electrical connection of the generator to effectively provide substantial amounts of ozone for purifying purposes.

INVENTOR.
WILLIAM H. RICE
BY
Oldham & Oldham
ATTORNEYS.

OZONE GENERATOR

A general object of the present invention is to provide a small, compact, relatively inexpensive, but efficient and low in operational cost ozone generator which is particularly adapted for home use or for purification with larger systems.

Other objects of the invention are to provide novel means for positioning improved electrode assemblies in an ozone generator, to provide a durable generator, to produce an ozone generator of low cost but high capacity, and to form special electrode assemblies for an ozone generator.

In order to better understand the apparatus of the invention, reference should be had to the accompanying drawings wherein.

Figure 1:
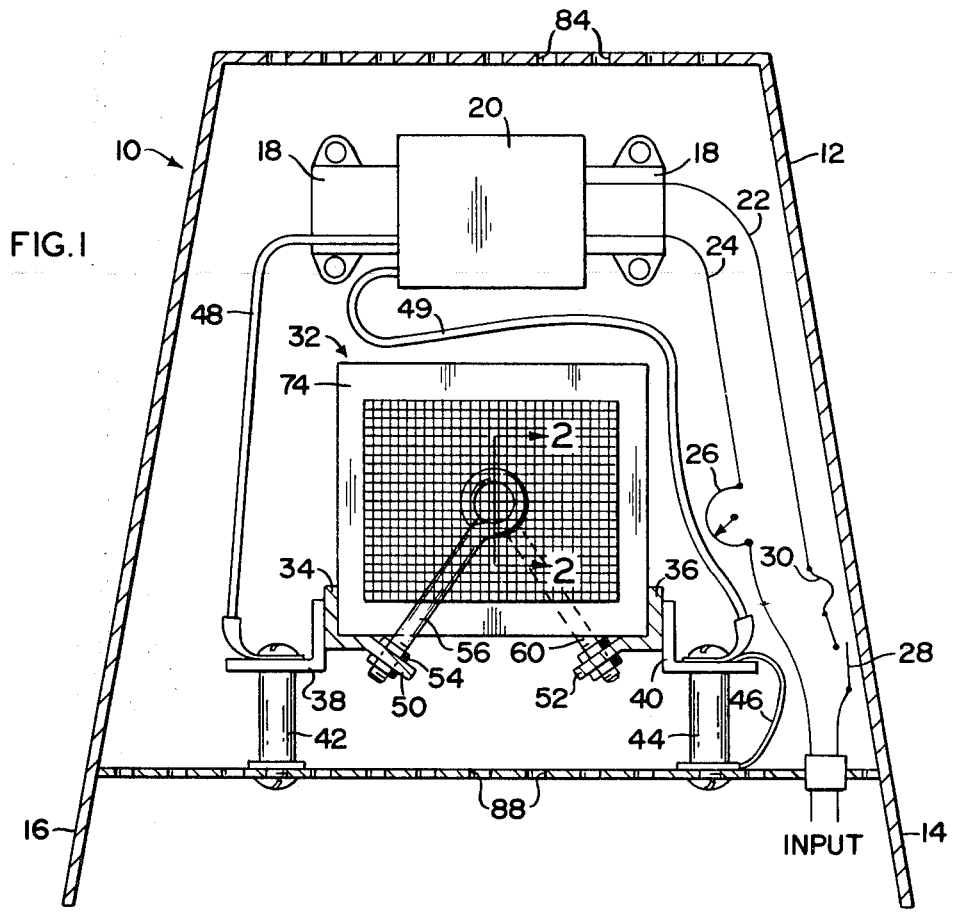
FIG. 1 is a side elevation of the ozone generator of the invention with the cover plate thereof removed to particularly illustrate the structure and diagrammatically show the electrical interconnection of the components of the generator.

Referring to the drawings in greater detail, and with particular reference to FIG. 1, the numeral 10 generally indicates the ozone generator of the invention. The generator consists of a metal frame 12 which includes a pair of legs 14 and 16 or other supports.

Mounted to the frame 12, as by suitable insulated brackets 18, is a transformer 20. The transformer 20 is a special low amperage, heavily insulated type particularly adapted for use in the ozone generator of the invention, its current output usually being less than one-half amp, but at from about 2,000 to about 4,000 volts. Such output being controllable by the load applied, power input etc. of the transformer. Input leads 22 and 24 are connected to the transformer to effect connection of the transformer with a source of electrical energy. Input lead 24 is provided with a manually operated rheostat 26 in order to control the current flow to the transformer 20, and input lead 22 is provided with a control switch 28 and a circuit breaker 30. The switch 28, circuit breaker 30, and rheostat 26 are usually mounted on the frame 12 and available for control action.

The actual ozone-producing means or ozonizer of the generator 10 is generally illustrated by the numeral 32. As will be explained in greater detail hereinafter, the ozonizer consists of a plurality of metal electrodes separated from each other by a suitable dielectric. The electrodes are spaced apart from each other leaving an airspace between them at which an electric discharge referred to as the corona discharge or corona effect takes place, resulting in the conversion of the oxygen in the airgap to ozone.

In order to support the ozonizer 32 in the frame 12, a pair of elongate brackets, bars, angles or flanges 34 and 36 are provided. The brackets 34 and 36 are substantially L-shaped members forming seats which support the components of the ozonizer 32. Second support flanges or bars 38 and 40 are welded or otherwise suitably secured to flanges 34 and 36, respectively, the flanges or members 38 and 40 being mounted in insulated relationship to the frame 12 by suitable ceramic insulating mounts 42 and 44, respectively. A suitable lead 46 effects an electrical connection between the flange 40 and the frame 12 or ground, and the transformer output leads 48 and 49 effect operative electrical connections between the transformer 20 and the mounting flanges or angles 34 and 36, respectively. Thus, the flanges 34 and 36 provide a very easy and convenient way to connect the ozonizer 32 electrically and to supply power to the alternate grid components of the ozonizer.

As is best illustrated by FIG. 1, edge portions 50 and 52, respectively, of the L-shaped flanges or angles 34 and 36 are bent out of the plane formed by the horizontal leg of the flanges. Mounted in substantially perpendicular relationship to longitudinally spaced portions of the bent portion 50 of the flange 34, as by suitable nuts 54 or other means, are conductive-mounting means shown as two or more eyebolts 56 and 58 which extend into substantially the center axis of the ozonizer 32. In like manner, a series of metal eyebolts 60 are mounted on the bent portion 52 of the flange 36 in axially spaced relation and with the eyebolts 60 also extending into the center axis of the ozonizer 32 and positioned between eyebolts 56 and 58. The eye portions of eyebolts 56, 58 and 60 are substantially in alignment with each other.

Figure 2:
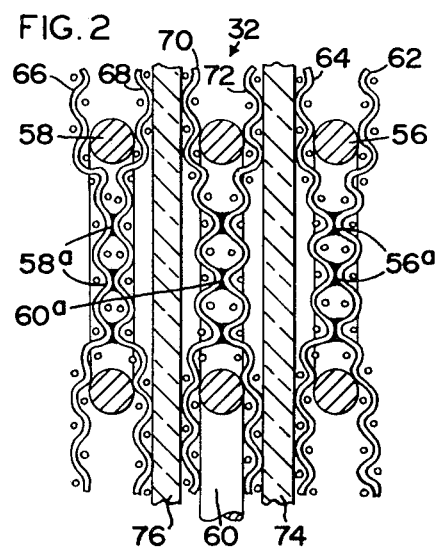
FIG. 2 is an enlarged, fragmentary, broken away cross-sectional view of the ozone-generating plates, as particularly seen from line 2—2 of FIG. 1.

Referring to the ozonizer 32 in greater detail, as shown in FIG. 2, a pair of substantially square or rectangular flattened wire meshes or grids are associated with the eye portion of each eyebolt 56, 58 and 60. For example, as best illustrated by FIG. 2, grids 62 and 64 are positioned on opposite sides or faces of the eye portion of the eyebolt 56, with the center portions of both grids being pushed together and welded to each other at 56a in the eye portion of the eyebolt 56. In a like manner, grids 66 and 68 are positioned on the eyebolt 58 with the center portions of the grids being welded to each other at 58a in the eye portion of the eyebolt 58. A pair of grids 70 and 72 are positioned on the eyebolt 60, the center portions thereof being welded to each other at 60a in the eye portion of the eyebolt 60. All of the wire grids are substantially identical to each other and are formed from a wire diameter mesh of about 0.020 inches. The dimensions of the wire grids are about 2¼ inches × 1½ inches and they preferably are centered on the eyes of the eyebolts. The grids are manufactured from a stainless steel having a chromium content of 18 percent to 20 percent, and a nickel content of 8 percent to 12 percent. Carbon is restricted to 0.08 maximum. The grid has an 0.0633-inch opening between the wire, and an open area of about 57.2 percent. The wire grids serve as the electrodes of the ozonizer 32 with the electrical or corona discharge at the grids of the charged eyebolts producing the ozone, and their design criteria, as set forth above, are critical to the maximum performance of the apparatus of the invention.

Supported by and extending between flanges 34 and 36 and positioned between and separating grids 64 and 72 is a dielectrical plate 74. Also supported by flanges 34 and 36 and positioned between and separating grids 68 and 70 is a similar dielectric plate or sheet 76. Dielectric plates 74 and 76 are each formed from a very thin sheet of high-grade insulated material such as mica and are equivalent insulators in the apparatus. The purpose of such dielectric plates 74 and 76 is to effectively control the corona discharge between the wire grids. Each sheet of mica 82 is approximately 0.0025-inch thick. The dimensions of the dielectric plates are about 2½ inches × 3¼ inches to extend beyond the wire grids about ½ inch in all directions. The mica is muscovite and at least ASTM V–7 standard or better. It has a specific gravity between 2.6 to 3.2, specific heat of 0.207, Moh hardness of 2.8 to 3.2, Shore hardness of 80 to 150, Volume Resistivity ohm/cm$^3$ of $2\times10^{13}$ to $1\times10^{17}$ and a dielectric constant of 6.5 to 8.7. The insulator sheets or equivalents are critical to the proper operating performance of the apparatus of the invention. The thickness of these sheets is not shown proportionally in the drawings.

Actual operation of the ozone generator of the invention is achieved by closing the switch 28 so that electric current is supplied to the transformer 20. Rheostat 26 is manually set to control the amount of current flow and hence control the volume and/or rate of ozone production desired. The output current of the transformer 20 flows by leads 48 and 49 to insulated angles or flanges 34 and 36 and it will also be transmitted to the grids 62 and 64 on the eyebolt 56, and the grids 66 and 68 on the eyebolt 58 while the grids 70 and 72 connecting to the eyebolts 60 will be grounded. Upon charging of the grids alternately in this manner, the electrical discharge or corona effect will take place at the grids 62 and 64; 66 and 68 etc., resulting in the conversion of oxygen in or flowing through the airgaps between the respective grids to ozone. A plurality of vents or holes 84 are provided in the top portion of the frame 12 and holes 86 are formed in a bottom plate 88 to allow the ozone produced to diffuse into the surrounding air. Or, preferably, the generator unit 10 is positioned in an enclosure or has an inlet and an outlet provided therefor and external means (not shown) will force air or other gases through the unit for ozonification. The frame 12 can be grounded in any suitable manner.

Figure 3:
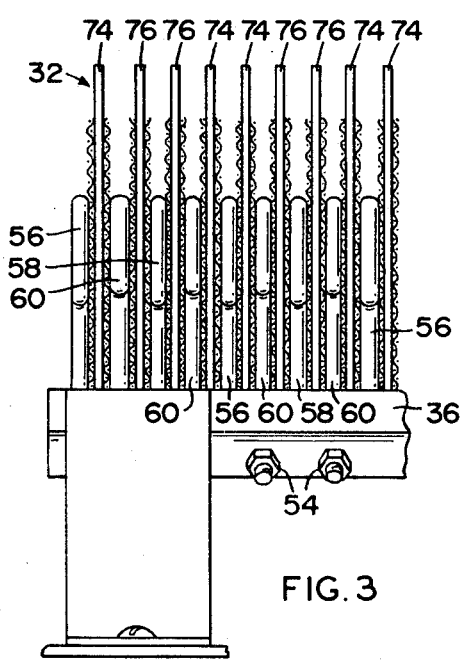
FIG. 3 is a fragmentary side elevation of a portion of the ozone generator assembly alone.

The unique arrangement of the brackets 34 and 36 so that they provide a supporting seat for the dielectric plates 74 and 76 of the ozonizer 32 while also mounting the respective eyebolts in properly angled and longitudinally spaced relation to each other allows the actual ozonizer 32 of the ozone generator 10 to be easily and quickly constructed. The upwardly extending legs of the brackets 34 and 36 are inclined slightly out of the vertical away from each other so that the dielectrics 74 and 76 can be readily slid into the seat formed by the brackets and are held in position by the adjacent grid and eyebolt units in the apparatus. Such mounting arrangement including the mounting and spacer eyebolts allows the unit to be easily and quickly assembled, while at the same time providing ready access to the components of the ozonizer 32 in case of any malfunctioning of the ozone-producing unit. It also greatly simplifies the electrical interconnection. Usually the metal components of the generator 32 are formed from stainless steel to avoid corrosion. As indicated in FIG. 3, any number of aligned grid units may be provided in the generator unit. The eyebolts are made from stainless steel, are current conductors, and may be of any suitable size. However, the stainless steel eyebolts are of such thickness that the insulator (mica) sheets 74 and 76 are on ¼-inch centers.

The stainless steel grids of the size disclosed with the thin but larger area mica sheets therebetween have been very efficient in the production of high purity ozone in good volume at low initial, as well as operating, cost at the range of voltages stated hereinbefore.

The flattened wire grids 62, 64 etc. are parallel to each other in use and maximum efficiency is obtained when at least one charged grid, as the grid 68, is provided at each end of the aligned stack of ozonator grids in the apparatus of the invention. The grids 62, 64 etc. are flattened prior to assembly with the eyebolts and are shown diagrammatically in the drawings rather than in proper flattened form.

The metal frame is made from stainless steel or other suitable material treated to resist corrosion by the ozone.

The output air from the ozone generator may be used in water, air and/or sewage purification action in any conventional manner.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. An ozone generator comprised of
a frame,
transformer means mounted on said frame,
an ozonizer means comprised of a plurality of substantially parallel electrode means having a dielectric therebetween,
a pair of substantially parallel support means mounted in insulated relationship on said frame extending substantially perpendicular to said electrode means and supporting said ozonizer means, at least one electrode means being connected to one of said support means and at least one electrode means being connected to the other of said support means,
said plurality of electrode means each including an eyebolt mounted on said support means and extending into about the center axis of the ozonizer means, and a pair of wire grids constituting each electrode means being positioned on opposite faces of the eye portion of each eyebolt and being secured to each other through the eye portion of each eyebolt, and
means effecting electrical connection between the terminals of said transformer means and said support means.

2. An ozone generator as in claim 1 wherein said electrode means each include a pair of substantially rectangular flattened stainless steel wire grids.

3. An ozone generator as in claim 1 wherein each of said support means includes an inwardly and downwardly extending section that is adapted to mount said eyebolts which extend into the center of the ozonizer means to position said wire grids on a common longitudinal axis.

4. An ozone generator according to claim 1 where the grids have a carbon content of less than 0.08 percent, where several units of electrode means with dielectric sheets between all electrodes of different charge are provided, and where there is about ¼-inch space between adjacent sheets of dielectric.

5. An ozone generator according to claim 1 where the generator is adapted to operate at between 2,000 and 4,000 volts, and the grids are made from stainless steel having a chromium content of 18 percent to 20 percent, a nickel content of 8 percent to 12 percent, and the carbon is less than 0.08 percent, and where there is an 0.0633-inch opening between wires and an open area of 57.2 percent.

6. An ozone generator as in claim 1 wherein said dielectric is formed from a thin piece of a substantially rectangular sheet of mica that protrudes from all margins of said wire grids.

7. An ozone generator according to claim 6 where the mica is muscovite having a specific gravity between 2.6 to 3.2, specific heat of 0.207, Moh hardness of 2.8 to 3.2, Shore hardness of 80 to 150, volume resistivity in ohms/cm of $2\times10^{13}$ to $1\times10^{17}$ and a dielectric constant of 6.5 to 8.7.

8. An ozone generator as in claim 1 wherein each of said support means is comprised of an L-shaped angle forming seats which receive and support the dielectric of the ozonizer means.

9. An ozone generator as in claim 8 wherein the L-shaped angles have vertically extending legs inclined slightly outwardly out of vertical whereby the dielectric sheets can be slid into the seats formed by the flanges and be firmly held in position because of the close relationship between the grids secured to adjacent ones of said electrode means.